(12) United States Patent
Amtmann

(10) Patent No.: US 7,126,994 B2
(45) Date of Patent: Oct. 24, 2006

(54) COMMUNICATION STATION AND DATA CARRIER WITH IMPROVED ACKNOWLEDGEMENT MEASURES

(75) Inventor: Franz Amtmann, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 730 days.

(21) Appl. No.: 09/938,381

(22) Filed: Aug. 24, 2001

(65) Prior Publication Data

US 2002/0011921 A1    Jan. 31, 2002

(51) Int. Cl.
  *H04L 27/00*    (2006.01)
(52) U.S. Cl. .................. 375/259; 340/10.1; 340/10.2
(58) Field of Classification Search ................ 375/259, 375/219, 221, 222; 370/312, 346, 349, 348; 455/435.1, 435.2, 435.3; 340/10.1, 10.2, 340/10.3, 10.5
See application file for complete search history.

(56) References Cited

U.S. PATENT DOCUMENTS

| | | | | |
|---|---|---|---|---|
| 5,142,694 A | * | 8/1992 | Jackson et al. | 455/67.11 |
| 5,539,394 A | * | 7/1996 | Cato et al. | 340/10.32 |
| 5,640,151 A | * | 6/1997 | Reis et al. | 340/10.2 |
| 5,668,803 A | * | 9/1997 | Tymes et al. | 370/312 |
| 5,686,902 A | | 11/1997 | Reis et al. | 340/825.54 |
| 5,990,806 A | * | 11/1999 | Mock et al. | 340/825.49 |
| 6,366,573 B1 | * | 4/2002 | Smith et al. | 370/349 |
| 2001/0012776 A1 | * | 8/2001 | Chandler et al. | 455/435 |

FOREIGN PATENT DOCUMENTS

| | | | |
|---|---|---|---|
| EP | 0467036 A2 | 5/1991 | |
| EP | 0694860 A2 | 7/1995 | |

* cited by examiner

*Primary Examiner*—Phuong Phu
(74) *Attorney, Agent, or Firm*—Adam L. Stroud

(57) ABSTRACT

In a method of communication between a communication station (1) and a plurality of data carriers (2) an interrogation signal (IDB) is generated with the aid of interrogation signal generating means (7) in order to start an interrogation cycle (IPER) and is supplied to all the data carriers (2) and with the aid of response signal generating means (63) each data carrier (2) generates a response signal (RDB), of which response signals (RDB) some of the response signals (RDB) are received separately and some are received non-separately, and the communication station (1) detects each separately received response signal (RDB) and consequently identifies the relevant data carrier (2), and an acknowledge signal (QDB) is supplied to each identified data carrier (2) whose response signal (RDB) has been received separately by the communication station (1), which acknowledge signal (QDB) is detected with the aid of acknowledge signal detection means (59) in each data carrier (2) and thus sets each identified data carrier (2) to an idle state, the communication station (1) advantageously generating each acknowledge signal (QDB) as a component of an extended interrogation signal (IDB+QDB).

4 Claims, 3 Drawing Sheets

COMMUNICATION STATION AND DATA CARRIER WITH IMPROVED ACKNOWLEDGEMENT MEASURES

FIELD OF THE INVENTION

The invention relates to a method of communication between a communication station and data carriers and to a communication station and to a data carrier, which are all known already and in which during communication between the communication station and a plurality of such data carriers the communication station first of all supplies an interrogation signal to all the data carriers present within a communication range of the communication station in the course of an interrogation cycle, after which the responsive data carriers each supply a response signal to the communication station. For the response signals generated with the aid of the data carriers a so-called collision occurs between some of these response signals, namely in the case that at least parts of at least two response signals appear in such a manner that they cannot be distinguished from one another, as a result of which the communication station is not capable of unambiguously identifying those data carriers from which the at least partly indistinguishable response signals originate. Subsequently, either no acknowledge signal or a negative acknowledge signal is supplied to such data carriers. However, of the response signals generated with the aid of the data carriers some of these response signals also appear separately, i.e. each of these response signals can be distinguished unambiguously from the other in such a manner that each of these response signals can be identified unambiguously with the aid of the communication station, after which the communication station supplies for each unambiguously identified response signal an acknowledge signal to the data carrier which has supplied this unambiguously identified response signal, as a result of which information is received and is subsequently available in the data carrier that the relevant data carrier has been identified unambiguously by the communication station.

BACKGROUND OF THE INVENTION

In the case of the known method, the known communication station and the known data carrier the communication station first generates an interrogation signal during an interrogation cycle and transfers this to all the data carriers present in the communication range of the communication station. The communication station is then set to transmitting and the data carrier to receiving. Subsequently, the communication station is switched from transmitting to receiving and the data carriers are switched from receiving to transmitting, after which the data carriers responding to the previously received interrogation signal transmit their response signals to the communication station. The transmission of the response signals from the data carriers to the communication station is then effected in so-called time slots, a given number of time slots being selected and each data carrier being assigned to a time slot on the basis of the serial number of each data carrier.

Within such a time slot one or more data carriers first of all each transfer a response signal to the communication station. In this time slot the communication is subsequently switched from receiving to transmitting and at the same time the data carrier or data carriers are switched from transmitting to receiving. This first switching operation within a time slot requires a certain switching time. Subsequently, the communication station transmits the acknowledge signal, which is a positive acknowledge signal when only one data carrier has transmitted a response signal to the communication station in the relevant time slot, or which is a negative acknowledge signal when more than one data carrier has transmitted a response signal to the communication station in the relevant time slot. After the transmission of the acknowledge signal another switching operation is effected, i.e. the communication station is now switched from transmitting to receiving and the data carrier or the data carriers are switched from receiving to transmitting. This switching operation also requires a certain switching time within a time slot. Thus, in the known method two switching time intervals occur in each time slot, which has the disadvantage that the length of an interrogation cycle is comparatively great and, consequently, the time required for unambiguously identifying all the data carriers present within the communication range of the communication station by means of a plurality of interrogation cycles is comparatively long.

Moreover, the known solutions exhibit the problem that the acknowledge signals, which are digital signals representing one bit or a bit string having a plurality of bits, are transmitted from the communication station to the data carriers without any security measures, which is unfavorable in view of a minimal susceptibility to interference, i.e. a maximal immunity to interference.

SUMMARY OF THE INVENTION

It is an object of the invention to preclude the aforementioned problems and to realize an improved method and an improved communication station as well as an improved data carrier at low cost and in a simple manner.

In order to achieve the aforementioned object a method in accordance with the invention has characteristic features in accordance with the invention, in such a manner that a method in accordance with the invention can be characterized in the manner defined hereinafter, namely:

A method of communication between a communication station and data carriers, which data carriers are present within a communication range of the communication station, in which for starting an interrogation cycle the communication station supplies an interrogation signal to all the data carriers present within the communication range, and in which during an interrogation cycle all the data carriers present within the communication range receive the interrogation signal and each supply a response signal in response to the interrogation signal, and in which of all the response signals the communication station receives some of the response signals individually and, as a consequence, separately and the communication station receives some of the response signals at least two at a time and, as a consequence, not separately, and in which the communication station supplies an acknowledge signal to any data carrier whose response signal has been received separately by the communication station, and in which the data carrier whose response signal has been received separately by the communication station receives and evaluates the acknowledge signal, and in which as a result of the evaluation of the acknowledge signal each data carrier whose response signal has been received separately by the communication station is disabled for interrogation signals supplied subsequently by the communication station, and in which after the termination of an interrogation cycle the communication station again supplies an interrogation signal in order to start a subsequent interrogation cycle, and in which the communication station generates each acknowledge signal as a component of an extended interrogation signal.

In order to achieve the aforementioned object a communication station in accordance with the invention has characteristic features in accordance with the invention, in such a manner that a communication station in accordance with the invention can be characterized in the manner defined hereinafter, namely:

A communication station for the communication with data carriers, which data carriers are present within a communication range of the communication station, in which interrogation signal generating means have been provided, with the aid of which an interrogation signal can be generated for starting an interrogation cycle, and in which transfer means have been provided, with the aid of which the generated interrogation signal can be supplied to all the data carriers present within the communication range, so that the interrogation signal can be received by all the data carriers present within the communication range, and in which station receiving means have been provided, with the aid of which all the response signals supplied by all the data carriers in response to a received interrogation signal can be received, in which of all the response signals some of the response signals can be received individually and, as a consequence, separately and some of the response signals can be received at least two at a time and, as a consequence, not separately, and in which acknowledge signal generating means have been provided, with the aid of which an acknowledge signal can be generated for each data carrier whose response signal has been received separately, which acknowledge signal can be supplied to the relevant data carrier with the aid of the station transfer means, and in which the acknowledge signal generating means and the interrogation signal generating means are adapted to cooperate with each other so as to enable each acknowledge signal to be generated as a component of an extended interrogation signal.

In order to achieve the aforementioned object a data carrier in accordance with the invention has characteristic features in accordance with the invention, in such a manner that a data carrier in accordance with the invention can be characterized in the manner defined hereinafter, namely:

A data carrier for the communication with a communication station, which communication station has a communication range, in which communication range such data carriers are present, in which data carrier receiving means have been provided, with the aid of which an interrogation signal supplied by the communication station can be received, and in which response signal generating means have been provided, with the aid of which a response signal can be generated in response to the received interrogation signal, and in which data carrier transfer means have been provided, with the aid of which the generated response signal can be supplied to the communication station, and in which acknowledge signal detection means have been provided, with the aid of which an acknowledge signal supplied to the data carrier by the communication station and received with the aid of the data carrier receiving means can be detected, and in which the acknowledge signal detection means are adapted to extract an acknowledge signal supplied to the data carrier as a component of an extended interrogation signal and received with the aid of the data carrier receiving means.

By providing the measures in accordance with the invention it is achieved at low cost and in a simple manner that when an interrogation cycle is carried out only the interrogation signal that can be generated with the aid of the communication station is transmitted to all the data carriers present within the communication range of the communication station and subsequently the response signals that can be generated with the aid of the data carriers are transmitted to the communication station, as a result of which during an interrogation cycle the communication station should be switched from transmitting to receiving and at the same time the data carriers should be switched from receiving to transmitting only after the transmission of the interrogation signal and before the transmission of the response signal, but that subsequently no further switching operations are required during the interrogation cycle because the acknowledge signal is advantageously generated with the aid of the communication station and transmitted to the data carriers only in the interrogation cycle that is activated and carried out subsequently, for which it is obviously required to switch the communication station from receiving to transmitting after the end of the previously performed interrogation cycle and the beginning of the subsequently performed interrogation cycle and to switch the data carriers from transmitting to receiving, which is necessary anyway, namely for the transmission of the following interrogation signal by the communication station and the reception of this following interrogation signal by the data carriers. Altogether, the measures in accordance with the invention provide a distinct reduction of the period of time required for an interrogation cycle, as a result of which the time required to identify all the record carriers present within the communication range of the communication station unambiguously with the aid of a plurality of interrogation cycles is comparatively short and distinctly shorter than in the prior art as described in the introduction. The provision of the measures in accordance with the invention has another advantage since the transmission of the acknowledge signal, which forms a component of the interrogation signal, is effected with a substantially greater immunity to interference than in the prior art as described hereinbefore, which is because the transmission of the interrogation signal is effected in a secure manner for reasons of security, for example in that the transmission of the interrogation signal is protected with the aid of a so-called CRC checksum. Thus, a security feature which is present anyway is used in addition for the transmission of the acknowledge signal included in the interrogation signal.

It has proved to be advantageous for a method in accordance with the invention and for a communication station in accordance with the invention as well as a data carrier in accordance with the invention when, in addition, the measures as defined in claims 1 and 2, and in claims 3 and 4, respectively, are taken. In practice, these embodiments have proved to be particularly advantageous because with these embodiments a particularly short time for an interrogation cycle is attainable and because with these embodiments a very rapid identification of all the data carriers in accordance with the invention within the communication range of the communication station is possible. Thus, it is achieved by simple means and in a simple manner that additional information coupled to the acknowledge signal can be transmitted from a communication station in accordance with the invention to a data carrier in accordance with the invention.

The aforementioned aspects as well as further aspects of the invention will be apparent from the example of an embodiment described hereinafter and will be elucidated with the aid of this example.

BRIEF DESCRIPTION OF THE DRAWINGS

The invention will be described in more detail hereinafter with reference to an embodiment which is shown in the drawings by way of example but to which the invention is not limited.

DETAILED DESCRIPTION

Figure 1:
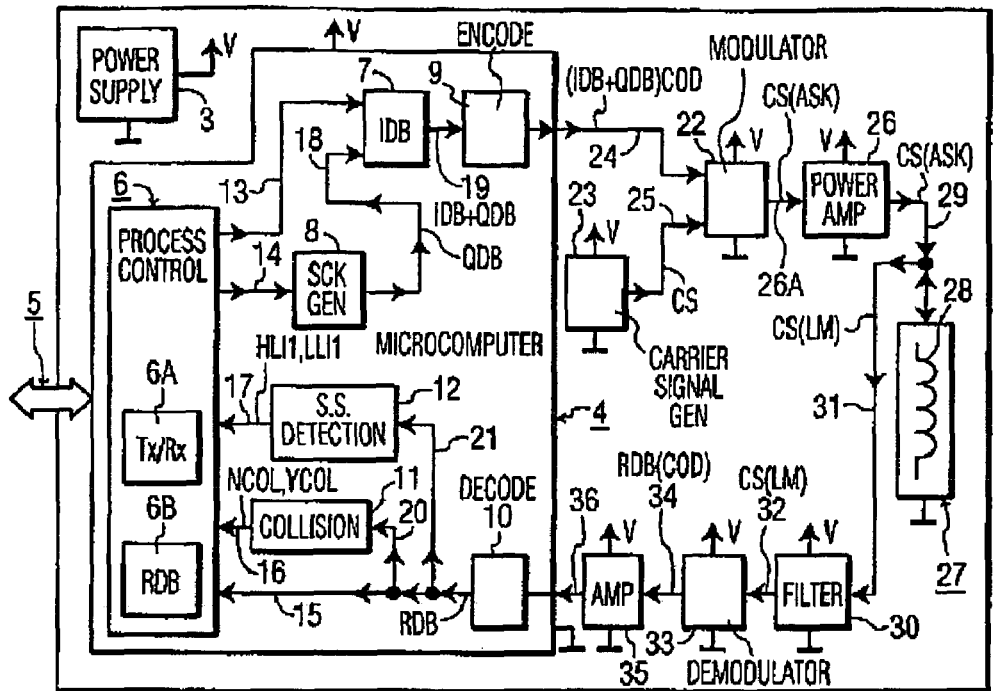
FIG. 1 is a block diagram which diagrammatically shows a communication station in accordance with the invention for the communication with data carriers.
Figure 2:
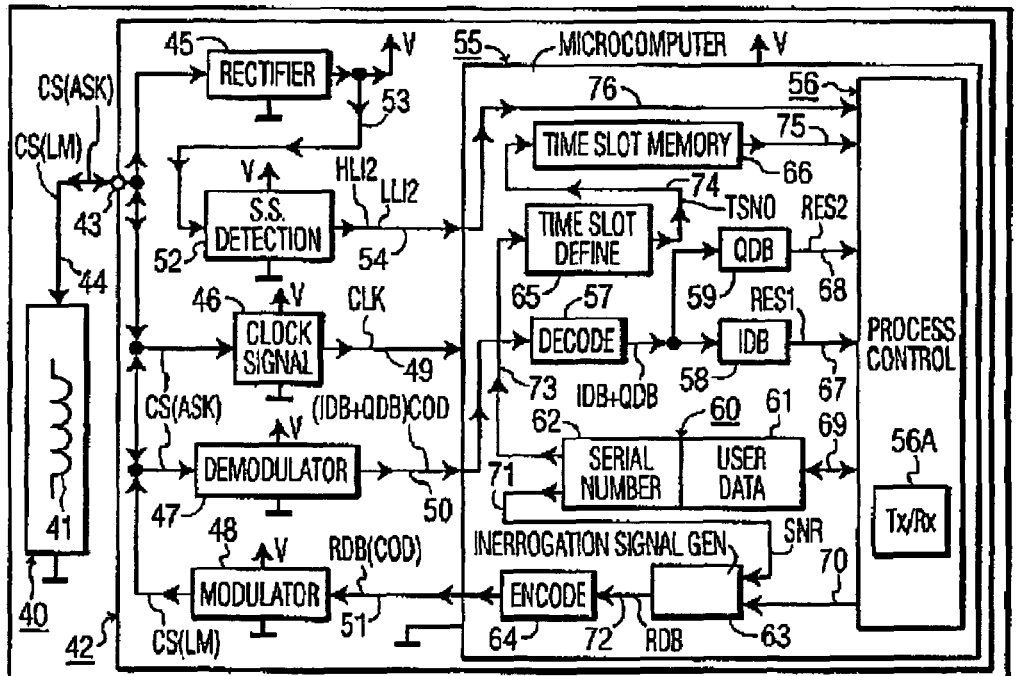
FIG. 2 shows, in a manner similar to FIG. 1, a data carrier for the communication with the communication station shown in FIG. 1.
Figure 3:
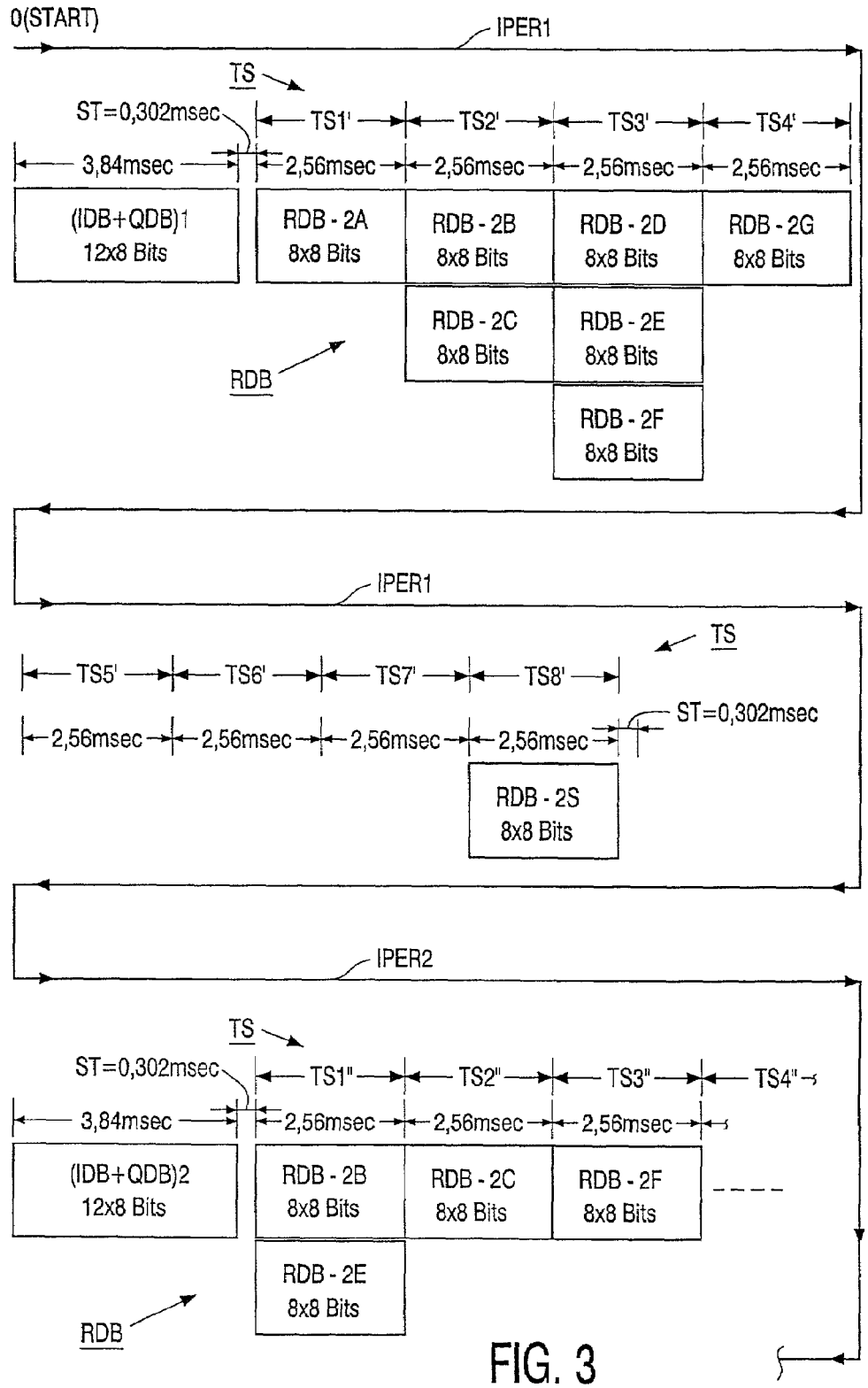
FIG. 3 is a schematic diagram which shows the time sequence of various signals which appear in succession in a method in accordance with the invention for the communication between the communication station shown in FIG. 1 and the data carrier shown in FIG. 2.

FIG. 1 shows a communication station 1 for the communication with data carriers 2, of which a data carrier 2 is shown in FIG. 2. Communication between the communication station 1 and the data carriers 2 is possible when the data carriers 2 are situated within a communication range of the communication station, i.e. are present in this communication range. The communication station 1 and the data carriers 2 are adapted to communicate in consecutive time slots TS, of which time slots FIG. 3 shows the time slots TS1', TS2', TS3', TS4' . . . TS8', and TS1", TS2", TS3", . . .

The communication station 1 includes a source 3 for the power supply of all the parts of the communication station which are to be powered.

The communication station 1 further includes a microcomputer 4. The microcomputer 4 is connected to a so-called host computer, not shown in FIG. 1, via a bus connection 5. The microcomputer 4 includes process control means 6 and interrogation signal generating means 7 and acknowledge signal generating means 8 and encoding means 9 and decoding means 10 and collision detection means 11 and signal strength detection means 12. The process control means 6 are connected to respective ones of the means 7, 8, 10, 11 and 12 via respective electrically conductive connections 13, 14, 15, 16 and 17. Furthermore, an electrically conductive connection 18 is arranged between the acknowledge signal generating means 8 and the interrogation signal generating means 7, and an electrically conductive connection 19 between the interrogation signal generating means 7 and the encoding means 9, and an electrically conductive connection 20 between the decoding means 10 and the collision detection means 11, and an electrically conductive connection 21 between the decoding means 10 and the signal strength detection means 12.

In the present case, the process control means 6 include mode switching means 6A, by means of which it is possible to switch between a "transmit" mode and a "receive" mode. In a manner not shown, the mode switching means 6A perform the change-over or control of all those parts of the communication station 1 which should be switched over in order to switch between the "transmit" mode and the "receive" mode. Such mode switching means 6A need not necessarily be provided because accurate information about the times of appearance and about the time sequence of transmitting states and receiving states is available anyway in the communication station. The process control means 6 further include response signal identification means 6B, with the aid of which each response signal RDB supplied by a data carrier 2 and received separately by the communication station 1 can be identified and, consequently, each data carrier 2 can be identified. The response signal identification means 6B may also take the form of a unit arranged between the decoding means 10 and the process control means 6.

Figure 4:
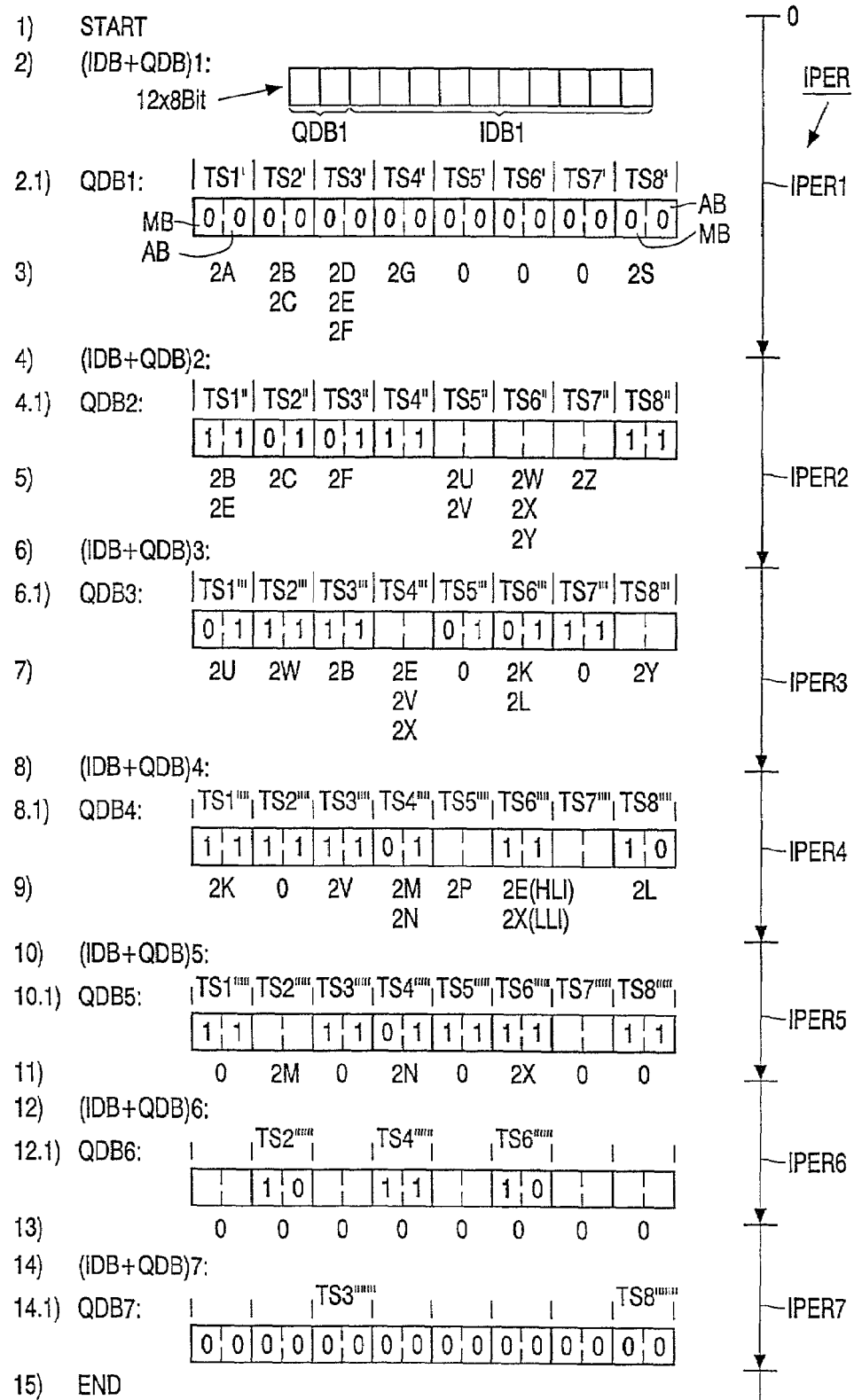
FIG. 4 is a schematic diagram which shows the time sequence of various signals, as also shown partly in FIG. 3.

The interrogation signal generating means 7 are adapted to generate interrogation signals IDB. However, the interrogation signal generating means 7 are capable of generating not only the interrogation signals IDB but also other command signals, for example write command signals or read command signals or erase signals and other signals. By means of each interrogation signal IDB it is possible to start an interrogation cycle IPER of an interrogation process, of which interrogation cycles two interrogation cycles IPER1 and IPER 2 are shown in FIG. 3 and seven interrogation cycles IPER1, IPER2, IPER3, IPER4, IPER5, IPER6 and IPER7 are shown in FIG. 4. Each interrogation signal IDB takes the form of a digital signal, which digital signal represents a bit string of a given number of bits. In the present case an interrogation signal IDB consists of 10×8 bits in total, i.e. of 80 bits. The signal duration per bit corresponds to 40 µs, as a result of which the signal duration of an interrogation signal IDB has a value of 3200 µs=3.2 ms.

The acknowledge signal generating means 8 are adapted to generate acknowledge signals QDB. With the aid of the acknowledge signal generating means 8 an acknowledge signal QDB can be generated for each data carrier 2, which, as will be described in more detail hereinafter, is adapted to generate and supply a response signal RDB and from which data carrier such a response signal RDB has been received separately by the communication station 1 and has thus been identified unambiguously with the aid of the communication station 1, which acknowledge signal QDB can be supplied to the relevant identified data carrier 2, namely with the aid of station output means, which will be referred to hereinafter.

In the present case, the communication station 1 is advantageously designed in such a manner that the acknowledge signal generating means 8 and the interrogation signal generating means 7 are configured to cooperate with one another, which is possible because the electrically conductive connection 18 has been provided between the means 7 and the means 8. Each acknowledge signal QDB generated by the acknowledge signal generating means 8 can be applied to the interrogation signal generating means 7 via the connection 18. The interrogation signal generating means 7 incorporate or embed a received acknowledge signal QDB in an interrogation signal IDB to be generated, as a result of which each acknowledge signal QDB can be generated as a component of an extended interrogation signal IDB+QDB, which extended interrogation signal will be referred to hereinafter as the combination signal IDB+QDB.

As regards the acknowledge signals QDB, it is to be noted that in the present case each acknowledge signal QDB is formed by a digital signal, which digital signal represents a bit string of a given number of main bits MB. In the present case each acknowledge signal consists of eight (8) main bits MB in total, the signal duration per main bit being 40 µs, as a result of which the signal duration for all the main bits MB of the acknowledge signal QDB has a value of 320 µs=0.32 ms.

As regards the acknowledge signals QDB, it is also pointed out that there is a very essential and advantageous feature, namely the fact that for each digital signal forming an acknowledge signal QDB each main bit is associated with a time slot TS and those main bits MB which are each associated with a time slot in which a response signal RDB from a data carrier 2 has occurred have a given bit value, i.e. the bit value "1" in the present case. This important feature will be described in more detail hereinafter.

With regard to the acknowledge signals QDB, it is to be noted that there is another important feature, namely the fact that for each digital signal forming an acknowledge signal QDB an additional bit AB has been added to each main bit MB and the bit value of each additional bit AB forms a representation of a parameter of a data carrier 2, the parameter of a data carrier 2 in the present case being formed by the signal strength, which is the signal strength with which the communication station 1 has received a response signal RDB from a data carrier 2. This important measure will also be described in more detail hereinafter. Therefore, each acknowledge signal QDB has eight (8) additional bits AB, the signal duration per additional bit AB being 40 µs, as a result of which the signal duration for all the additional bits of the acknowledge signal QDB has a value of 320 µs=0.32 ms.

Thus, the digital signal generated as the acknowledge signal QDB consists of 2×8=16 bits in total, which yields a signal duration of 640 µs=0.64 ms for the acknowledge signal QDB. Consequently, the combination signal IDB+QDB, which comprises 12×8 bits in total, has a signal duration of 3.84 ms.

The encoding means 9 serve to and are adapted to encode the combination signal IDB+QDB. In the present case, the encoding means 9 are adapted to perform a so-called Manchester coding. After encoding the encoding means 9 supply an encoded combination signal (IDB+QDB)COD.

The communication station 1 further includes a modulator 22 and a carrier signal generator 23. The carrier signal generator 23 can generate an unmodulated carrier signal CS. The modulator 22 is arranged to receive the encoded combination signal (IDB+QDB)COD via a line 24 and the unmodulated carrier signal CS via a further line 25. The modulator 22 is adapted to effect an amplitude modulation of the unmodulated carrier signal CS in dependence on the encoded combination signal (IDB+QDB)COD. After the modulation the modulator 22 supplies a carrier signal CS(AK) that has been amplitude-modulated in dependence on the encoded combination signal (IDB+QDB)COD on its output.

Such an amplitude modulation of the unmodulated carrier signal CS with the aid of the modulator 22 is effected in the "transmit" mode of the communication station 1, in which "transmit" mode the parts of the communication station 1 are controlled so as to enable a signals to be supplied from the communication station 1 to the data carriers 2. As already stated, the communication station 1 can also be set to the "receive" mode. In the "receive" mode the carrier signal generator 23 supplies the unmodulated carrier signal CS to the modulator 22 via the line 25, but in the "receive" mode the modulator 22 does not amplitude-modulate the unmodulated carrier signal CS, as a result of which the modulator supplies the unmodulated carrier signal CS on its output.

The communication station 1 further includes a power amplifier 26, which is connected to the modulator 22 via a line 26A. In the "transmit" mode the amplitude-modulated carrier signal CS(ASK) and in the "receive" mode the unmodulated carrier signal CS can be amplified with the aid of the power amplifier 26. Upon amplification one of the two signals CS(ASK) and CS is applied to transfer means 27 of the communication station 1 depending on the activated mode of operation. The transfer means 27 form both station transmitting means and station receiving means. The transfer means 27 include a transmission coil 28 shown in FIG. 1. In the "transmit" mode the transfer means 27, which transfer means 27 then operate as station transmitting means, can transfer the amplitude-modulated carrier signal CS(ASK) to all the data carriers 2 present within the communication range of the communication station 1, as a result of which the amplitude-modulated carrier signal CS(ASK) can be received by all the data carriers 23 present within the communication range of the communication station 1. Since the amplitude-modulated carrier signal CS(ASK) represents the encoded combination signal (IDB+QDB)COD, which encoded combination signal (IDB+QDB)COD in its turn represents the interrogation signal IDB and the acknowledge signal QDB, it is achieved that with the aid of the transfer means 27 each generated interrogation signal IDB and each generated acknowledge signal QDB can be transferred to all the data carriers 2 present within the communication range of the communication station 1, as a result of which each generated interrogation signal IDB and each generated acknowledge signal QDB can be received by all the data carriers 2 present within the communication range of the communication station 1.

In response to the reception of an interrogation signal IDB each data carrier 2 present within the communication range of the communication station 1 generates a response signal RDB, which will be described in greater detail hereinafter. The response signal RDB generated by each data carrier 2 is transferred from the relevant data carrier 2 to the communication station 1 by a load modulation of the unmodulated carrier signal CS applied in non-modulated form to the transfer means 27 in the communication station 1. In this case, the communication station 1 is, of course, in the "receive" mode. In the "receive" mode the transfer means 27 operate as station receiving means. In the "receive" mode the transfer means 27 can receive all the response signals RDB supplied by all the data carriers 2 within the communication range of the communication station in response to a received interrogation signal IDB. In this respect, reference is made to FIG. 3, which shows such response signals RDB, namely the response signals RDB-2A, RDB-2B, RDB-2C, RDB-2D, RDB-2E, RDB-2F, RDB-2G and RDB-2S. The letters A, B, C, D, E, F, G and S serve to denote that the response signals originate from different data carriers 2, namely from the data carriers 2A, 2B, 2C, 2D, 2E, 2F, 2G and 2S. As is apparent from FIG. 3, some of the response signals RDB-2A, RDB-2G, RDB-2S, RDB-2C and RDB-2F among all the response signals RDB can each be received individually and, as a consequence, separately and solely when appearing in a time slot TS1', TS4', TSD8', TS2" and TS3", respectively. Some other ones of the response signals RDB-2B, RDB-2C, RDB-2D, RDB-2E and RDB-2F and once more RDB-2B and RDB-2E can be received at least in pairs and, as a consequence, not separately and appearing at least in pairs in a time slot TS2', TS3' and TS1".

Each of response signals RDB transmitted by the data carriers 2 and received by the communication station RDB is formed by a digital signal, which digital signal represents a bit string having a given number of bits. In the present case, this bit string consists of 8×8=64 bits. The signal duration per bit is approximately 40 µs, as a result of which the signal duration for a response signal RDB has a value of 2.56 ms.

In the present case, as already stated, the response signals RDB generated by the data carriers 2, after prior encoding, can be transmitted to the communication station 1 by a load modulation of the unmodulated carrier signal CS generated by means of the carrier signal generator 23 in the communication station, as a result of which the transfer means 27 generate a load-modulated carrier signal CS(LM), which can be applied to filter means 30 of the communication station 1 via a line 31. After the load-modulated carrier signal CS(LM) has been filtered the load-modulated carrier signal CS(LM) can be applied to a demodulator 33 of the communication station 1 via a line 32. The load-modulated carrier signal CS(LM) can be demodulated by means of the demodulator 33. After the demodulation the demodulator 33 supplies encoded response signals (RDB)COD to an amplifier 35 via a line 35, which amplifier supplies the amplified encoded response signals (RDB)COD to the decoding means 10 realized with the aid of the microcomputer 4.

The decoding means 10 serve to and are adapted to decode the encoded response signals (RDB)COD applied to them. After completion of the decoding the decoding means 10 supply the decoded response signals RDB. Subsequently, the response signals RDB are applied to the response signal identification means 6B, which in the present case are included in the process control means 6. The response signal identification means 6B enable response signals RDB that appear singly to be identified unambiguously.

Furthermore, the response signals RDB are applied to the collision detection means 11. The collision detection means 11 are adapted to detect whether a response signal RDB from a single data carrier 2 has appeared in a time slot TS or whether the response signals RDB from two or more data carriers 2 have appeared in one time slot TS. In the case that only one response signal RDB is received in a time slot TS the collision detection means 11 supply negative collision information NCOL to the process control means 6 via the electrically conductive connection 16. However, when at least two response signals RDB are received in one time slot TS the collision detection means 11 supply positive collision information YCOL to the process control means 6.

The response signals RDB supplied by the decoding means 10 can also be applied to the signal strength detection means 12 via the electrically conductive connection 21. The signal strength detection means 12 are adapted to be capable of detecting whether the signal strength of the response signal RDB transmitted by a data carrier and received by the communication station 1 lies below a given threshold value or above this threshold value after having been received. When the signal strength is below the threshold value the signal strength detection means 12 supply low-level information LLI1 to the process control means 6 via the electrically conductive connection 17. Conversely, when the signal strength exceeds the threshold value the signal strength detection means 12 supply high-level information HLI1 to the actuating means 6.

The data carrier 2 shown in FIG. 2 will now be described hereinafter.

The data carrier 2 has transfer means 40, which form both data carrier receiving means and data carrier transmitting means. The transfer means 40 include a transmission coil 41, which is shown in FIG. 2. The transfer means 40 further include a capacitor configuration, not shown, which together with the transmission coil 41 forms a resonant circuit whose resonant frequency corresponds to the frequency of the unmodulated carrier signal TS.

An interrogation signal supplied by the communication station 1 and an acknowledge signal QDB supplied by the communication station 1 can be received with the aid of the transfer means 40. Furthermore, a response signal RDB generated by the data carrier 2 can be supplied to the communication station 1 with the aid of the transfer means 40. The reception of an interrogation signal IDB and an acknowledge signal QDB, i.e. the reception of a combination signal IDB+QDB, is effected by receiving the amplitude-modulated carrier signal CS(AK), which corresponds to the encoded combination signal (IDB+QDB)COD. The supply of a generated response signal RDB is effected with the aid of the load-modulated carrier signal CS(LM), which corresponds to an encoded response signal (RDB)COD, which in its turn corresponds to the response signal RDB.

The data carrier 2 includes an electrical circuit 42, which takes the form of an integrated circuit and which has a terminal 43 connected to the transfer means 40 via a line 44. The terminal 43 is connected to rectifier means 45, to clock signal regeneration means 46, to a demodulator 47 and to a modulator 48.

The rectifier means 45 serve for the rectification of the signal appearing on the terminal 43, i.e. either the amplitude-modulated carrier signal CS(ASK) or the load-modulated carrier signal CS(LM), in order to derive a direct voltage V from these signals, which direct voltage V can be used for energizing all the parts of the circuit 42 of the data carrier 2 which require such a supply voltage.

The clock signal regeneration means 46 enable a clock signal to be regenerated from the amplitude-modulated carrier signal CS(ASK) or the load-modulated carrier signal CS(LM). Upon completion of the regeneration the clock signal regeneration means 46 produce a regenerated clock signal CLK on a line 49.

The demodulator 47 is an amplitude demodulator and serves to demodulate the amplitude-modulated carrier signal CS(ASK). After amplitude-demodulation of the amplitude-modulated carrier signal CS(ASK) has been completed the demodulator 47 transfers the amplitude-demodulated combination signal (IDB+QDB)COD to the line 50.

The modulator 48 is formed by load modulation means and serves for the load modulation of the unmodulated carrier signal CS. The signals to be modulated can be applied to the modulator 48 via a line 51. Thus, it is also possible to apply an encoded response signal (RDB)COD to the modulator 48 in order to perform a load modulation of the unmodulated carrier signal CS in dependence on the encoded response signal (RDB)COD. As a result of the load-modulation with the aid of the modulator 48 a load-modulated carrier signal CS(LM) is obtained, which appears on the output of the modulator 48 and is also available at the transfer means 40 via the terminal 43 and is transferred to the transfer means 27 of the communication station 1 by the transfer means 40.

The circuit 42 of the data carrier 2 further includes signal strength detection means 52 connected to the output of the rectifier means 45 via a line 53. The signal strength detection means 52 serve to detect whether the amplitude-modulated carrier signal CS(ASK) supplied by the communication station 1 is received by the data carrier 2 with a signal strength below a threshold value or with a signal strength above a threshold value. The detection process to be carried out for this purpose is carried out using the d.c. supply voltage V supplied by the rectifier means 45. When the amplitude-modulated carrier signal CS(ASK) is received with a high signal strength, the signal strength detection means supply high-level information HLI2 to a line 54. Conversely, when the amplitude-modulated carrier signal CS(ASK) is received with a low signal strength, the signal strength detection means supply low-level information LLI2 to the line 54. Said information HLI2 and LLI2 can be applied to the microcomputer 55 via the line 54 and in the microcomputer 55 it cam be applied to the process control means 56 via an electrically conductive line 76.

The circuit 42 of the data carrier 2 includes a microcomputer 55. By means of the microcomputer 55 process control means 56 are realized, which means include switching means 56A. The switching means 56A serve to and are adapted to switch the data carrier 2 between its "receive" mode and its "transmit" mode. All the parts of the circuit 42 which require such a change-over can be switched over with the aid of the switching means 56. The microcomputer 55 receives the regenerated clock signal CLK via the line 49, which clock signal CLK is used in a customary and known manner in the microcomputer 55.

It is to be noted that instead of the microcomputer 55 a hard-wired logic circuit may be provided.

The microcomputer 55 is further used to realize decoding means 57 and interrogation signal detection means 58 and acknowledge signal detection means 59 and memory means 60, which have a user-data memory section 61 and a serial-number memory section 62, and interrogation signal generating means 63 and encoding means 64 as well as time slot defining means 65 and time slot number memory means 66.

The decoding means 57 are connected to the demodulator 47 via the line 50. With the aid of the decoding means 57 the encoded combination signal (IDB+QDB)COD can be decoded. Upon completion of the decoding the decoding means 57 supply the combination signal IDB+QDB. The combination signal IDB+QDB is supplied both to the interrogation signal detection means 58 and to the acknowledge signal detection means 59.

The interrogation signal IDB transferred from the communication station 1 to the data carrier 2 can be detected and evaluated with the aid of the interrogation signal detection means 58. The detected interrogation signal IDB is available in the interrogation signal detection means 58. Upon evaluation of the detected interrogation signal IDB the interrogation signal detection means 58 supply first detection information RES1 to the process control means 56 via an electrically conductive connection 67.

A acknowledge signal QDB transferred from the communication station 1 to the data carrier 2 and received with the aid of the transfer means 40 can be detected and evaluated with the aid of the acknowledge signal detection means 59. The detected acknowledge signal QDB is available in the acknowledge signal detection means 59. Upon completion of the evaluation the acknowledge signal detection means 59 supply second detection information RES2 to the process control means 56.

In the present case, the acknowledge signal detection means 59 are adapted to extract the acknowledge signal QDB transferred to the data carrier 2 as a component of the combination signal IDB+QDB and received with the aid of the transfer means 40. The acknowledge signal detection means 59 are adapted to evaluate a digital signal received as acknowledge signal QDB, which digital signal represents a bit string having a given number of main bits and in which digital signal each main bit is associated with a time slot TS, those main bits which are associated with a time slot TS in which only one response signal RDB from a data carrier 2 has appeared having a given bit value, in the present case the bit value "1". This important feature will be described in more detail hereinafter.

As regards the acknowledge signal detection means 19 it is to be noted that it is important that the acknowledge signal detection means 59 are adapted to evaluate a difference signal received as acknowledge signal QDB, in which digital signal at least one additional bit has been added to each main bit and the bit value of each additional bit forms a representation of a parameter of the data carrier 2. In the present case the represented parameter of the data carrier is the signal strength with which the communication station 1 has received a response signal RDB from the data carrier 2.

The memory means 60 serve to store data and information which is required in the data carrier 2 and which is important for the data carrier 2. The user data memory section 61 mainly serves to store user data, i.e. data of the user of the data carrier 2, for example to store the value of a credit or the magnitude of a price or a type designation and many other data. The serial number memory section 62 serves to store a so-called serial number SNR, which serial number SNR is characteristic of the data carrier 2. A special serial number SNR is assigned to each data carrier 2 and is stored in the serial number memory section 62, as a result of which each data carrier 2 can be distinguished from all the other data carriers 2 with the aid of the serial number SNR. The memory means 60 are connected to the process control means 56 via an electrically conductive connection 69, bi-directional communication (read/write) being possible via the connection 69.

The response signal generating means 63 are connected to the process control means 56 via an electrically conductive connection 70. Furthermore, the response signal generating means 63 are connected to the serial number memory section 62 via an electrically conductive connection 71. The response signal generating means 63 serve to generate a response signal RDB, the serial number stored in the serial number memory section being reflected in the response signal RDB. A response signal RDB generated with the aid of the response signal generating means 63 is applied to the encoding means 64 via an electrically conductive connection 72. The encoding means 64 encode the applied response signal RDB and supply an encoded response signal (RDB) COD to the line 51 and, consequently, to the modulator 48. The encoding means 64 are adapted to encode the response signal RDB in accordance with a so-called Manchester code.

As already stated, the data carrier 2 is adapted to communicate in time-sequential time slots TS. In order to define for the data carrier 2 in which time slot TS of a plurality of time slots TS the data carrier 2 should transfer its response signal QDB to the communication station 1, the time slot number defining means 65 have been provided. In the present case, the time slot number defining means 65 are connected to the serial number memory section 62 via an electrically conductive connection 73. Each time a part of the serial numbers SNR are applied from the serial number memory section 62 to the time slot number defining means 65 via the connection 73, as a result of which the time slot number defining means 65 each time define a time slot number TSNO in dependence on the applied part of the serial numbers SNR. After the time slot number TSNO has been defined, the time slot number TSNO is applied to the time slot number memory means 66 via an electrically conductive connection 74. The previously defined time slot number TSNO is stored in the time slot number memory means 66. The time slot number TSNO stored in the time slot number memory means 66 can be read out of said means and can be applied to the process control means 56 via an electrically conductive connection 75.

It is to be noted that the generation and definition of the time slot number TSNO may also be effected in a manner other than by means of a part of the serial number SNR, for example with the aid of a random number generator.

A method of communicating between the communication station 1 shown in FIG. 1 and data carriers 2A, 2B, 2C, 2D, 2E, 2F, 2G, 2K, 2L, 2M, 2N, 2P, 2S, 2U, 2V, 2W, 2X, 2Y and 2Z will now be described hereinafter. Of the complete communication process, in which it is possible, for example, to write data into the user data memory section 61 of each data carrier 2 or to read data from this user data memory section 61, only the relevant part will be described, i.e. the interrogation process required at the beginning of such a communication process, in which interrogation process all the data carriers 2 already present in the communication range of the communication station 1 at the start of the interrogation process as well as data carriers 2 which newly enter the communication range of the communication station 1 in the course of such an interrogation process are accurately detected and identified. This interrogation process will be described hereinafter with reference to FIGS. 3 and 5.

The interrogation process is started at a starting instant START (see item 1 in FIG. 4). At the starting instant START the communication station 1 is in the "transmit" mode and all the data carriers 2 present within the communication range of the communication station 1 are in the "receive" mode. At the starting instant START the first interrogation cycle IPER1 begins.

Directly after the start (see item 2 in FIG. 4) a first combination signal (IDB+QDB)1 is generated with the aid of the interrogation signal generating means 7 and the acknowledge signal generating means 8 of the communication station 1 and is transmitted by the communication station 1 to all the data carriers 2 present within the communication range of this station, the data carriers 2A, 2B, 2C, 2D, 2E, 2F, 2G and 2S being assumed to be within the communication range of the communication station at this instant. The precise structure of the interrogation signal IDB within the first combination signal (IDB+QDB)1 is not described in more detail here because this is not relevant in the present context. With regard to the first acknowledge signal QDB1 contained in the first combination signal (IDB+QDB)1 (see item 2.1 in FIG. 4) it is pointed out again that this acknowledge signal QDB1, as well as any further acknowledge signals, consists of eight (8) main bits MB and of eight (8) additional bits AB, each main bit MB and each additional bit AB forming a pit pair. Each bit pair is associated with a time slot, i.e. in the case of the first acknowledge signal QDB1 the time slots TS1', TS2', TS3', TS4', TS5', TS6', TS7' and TS8'. As is apparent from item 2.1 in FIG. 4, all the main bits MB and all the additional bits AB of the first acknowledge signal QDB1 have the value "0".

After the transfer of the first combination signal (IDB+QDB)1 the communication station is switched from the "transmit" mode to the "receive" mode with the aid of the mode switching means 6A and all the data carriers 2 are switched from the "receive" mode to the "transmit" mode with the aid of the switching means 56A. This first switching process requires a certain switching time ST. In the present case, a value of 302 μs is selected for the switching time ST.

After the aforementioned data carriers have received the combination signal (IDB+QDB)1 this signal is evaluated with the aid of the interrogation signal detection means 58 and the acknowledge signal detection means 59. The evaluation of the interrogation signal within the first combination signal (IDB+QDB)1 is not described in any further detail because it is not relevant in the present case. As regards the evaluation of the first acknowledge signal QDB1 it is to be noted that the evaluation of all the main bits MB, which all have the value "0", yields the result that none of the data carriers 2 that are present should acknowledge receipt. The evaluation of the additional bits AB in the first acknowledge signal QDB1 reveals that so far no data carrier 2 has transmitted a response signal RDB to the communication station 1.

Subsequently, the aforementioned data carriers define, each for themselves, in which time slot TS they generate a response signal RDB. This is effected with the aid of the time slot number defining means 65. After the respective time slot TS has been defined, the response signal generating means 63 of each data carrier 2 generate a response signal RDB, so that in the present case the response signals RDB-2A, RDB-2B, RDB-2C, RDB-2D, RDB-2E, RDB-2F, RDB-2G and RDB-2S are generated in the course of the first interrogation cycle IPER1 and are transferred to the communication station 1. As is apparent from FIG. 3 and also from FIG. 4 (see item 3 in FIG. 4) the aforementioned response signals are transferred to the communication station 1 in certain time slots, namely: RDB-2A in TS1', RDB-2B and RDB-2C in TS2', RDB-2D and RDB-2E and RDB-2F in TS3', RDB-2G in TS4' and RDB-2S in TS8'. Thus, the situation is obtained that of all the response signals RDB the communication station 1 receives some of the response signals RDB-2A, RDB-2G and RDB-2S individually and therefore separately and appearing alone in a time slot TS1', TS4' and TS8', respectively, and that the communication station 1 receives some other response signals RDB-2B, RDB-2C, RDB-2D, RDB-2E, RDB-2F in combinations of two or three and therefore not separately.

The response signals RDB received by the communication station 1 are applied from the decoding means 10 to the process control means 6 and the collision detection means 11 as well as the signal strength detection means 12 via the electrically conductive connection 15. In the case of the response signal RDB-2A in the time slot TS1' and in the case of the response signal RDB-2B in the time slot TS4' and in the case of the response signal RDB-S in the time slot TS8' the collision detection means 11 detect that there is no collision between two response signals RDB, as a result of which said means transfer the negative collision information NCOL to the process control means 6 via the connection 16. However, the collision detection means 11 detect a collision between response signals RDB in the time slots TS2' and TS3', namely between the response signals RDB-2B and RDB-2C and between the response signals RDB-2D and RDB-2E as well as RDB-2F, as a result of which the collision detection means 11 detect a collision in each of the two time slots TS2' and TS3' and, consequently, apply positive collision information YCOL to the process control means 6 via the connection 6. Furthermore, the signal strengths of the received response signals RDB are detected and determined with the aid of the signal strength detection means 12. It is assumed that all the aforementioned response signals have been received with a high signal level, as a result of which the signal strength detection means 12 detect a high level for each response signal received and, consequently, apply high-level information HLI1 to the process control means 6 via the connection 17. In the situation outlined above the response signals RBD-2A and RDB-2G and RDB-2S are identified unambiguously with the aid of the response signal identification means 6B included in the process control means 6, as a result of which the relevant data carriers 2A, 2G and 2S should be regarded as unambiguously identified.

After the evaluation and processing of all the response signals RDB received by the communication station 1 in the course of the first interrogation cycle IPER1 a change-over from the "receive" mode to the "transmit" mode is effected with the aid of the mode switching means 6A in the communication station 1 and a change-over from the "transmit" mode to the "receive" mode is effected with the aid of the mode switching means 56A in all the data carriers 2. This second switching process also requires a given switching time, i.e. also the switching time ST, which has a value of 302 µs in the present case. After the aforementioned switching process the first interrogation cycle IPER1 has come to an end.

Subsequent to the first interrogation cycle IPER1 the second interrogation cycle IPER2 is started. Directly after the start of the second interrogation cycle IPER2 the communication station 1 supplies a second combination signal (IDB+QDB)2 (see item 4 in FIG. 4). This second combination signal (IDB+QDB)2 includes the second acknowledge signal QDB2 (see item 4.1 in FIG. 4). This second acknowledge signal QDB2 is formed on the basis of data and information applied to the process control means 6 by the decoding means 10 via the connection 15 and by the collision detection means 11 via the connection 16 as well as by the signal strength detection means 11 via the connection 17 in the course of the first interrogation cycle IPER1. As a result of the single occurrence of the response signals RDB-2A and RDB-2G and RDB-2S in the time slots TS1', TS4' and TS8' the main bits MB in the second acknowledge signal QDB2 associated with the first time slot, the fourth time slot and the eighth time slot, respectively, have been set to the value "1", while the main bits MB associated with the second time slot and the third time slot have been set to the value "0" because a collision has been detected in each of these two time slots in the first interrogation cycle IPER1. Since all the response signals received in the course of the first interrogation cycle IPER1 have been received with a high signal strength, i.e. with a high signal level, all the additional bits AB in the second acknowledge signal QDB2 which are associated with the first, the second, the third, the fourth and the eighth time slot have been set to the value "1".

The second acknowledge signal QDB2 described hereinbefore is transmitted, as a component of the extended acknowledge signal, i.e. of the second combination signal (IDB+QDB)2, to all the data carriers not yet identified and located within the communication range of the communication station 1. As is apparent from FIG. 4 (see item 5 in FIG. 4), it is assumed that during the second interrogation cycle IPER2 not only the 2A, 2B, 2C, 2D, 2E, 2F, 2G and 2S, already present within the communication range of the communication station 1 during the first interrogation cycle IPER1, are present but also newly entered data carriers are present in the communication range, namely the data carriers 2U, 2V, 2W, 2X, 2Y and 2Z. Of the enumerated data carriers the data carriers 2A, 2G and 2S were identified unambiguously during the first interrogation period IPER1.

Each second combination signal (IDB+QDB)2 is applied to the aforementioned data carriers 2A, 2B, 2C, 2D, 2E, 2F, 2G, 2S, 2U, 2V, 2W, 2X, 2Y and 2Z. Subsequently, the interrogation signal within the second combination signal (IDB+QDB)2 is extracted and evaluated with the aid of the interrogation signal detection means 58, which will not be described in further detail. Furthermore, the second acknowledge signal QDB2 is extracted from the second combination signal (IDB+QDB)2 and evaluated with the aid of the acknowledge signal detection means 59, after which the acknowledge signal detection means 59 supply second detection information RES2 to the process control means 56. Subsequently, an acknowledge process is carried out in the data carriers 2A, 2G and 2S that have already been identified unambiguously, which acknowledge process is carried out by the evaluation of the main bits MB which are associated with the first, the fourth and the eighth time slot and which all have the bit value "1". Thus, acknowledgement is achieved for the data carriers 2A, 2G and 2S, in which as a result of the knowledge of the time slot numbers TSNO stored in their time slot memory means 66 it is known in which time slots they have supplied a response signal during the preceding first interrogation cycle IPER1, as a result of which these three data carriers 2A, 2G and 2S are set to an idle state and consequently no longer respond to the interrogation signal included in the second combination signal (IDB+QDB)2 nor to any other interrogation signals. For the other data carriers 2B, 2C, 2D, 2E, 2F, 2U, 2V, 2W, 2X, 2Y and 2Z no acknowledgement takes place and therefore they respond to the interrogation signal contained in the second combination signal (IDB+QDB)2.

As a result of the aforementioned response to the interrogation signal contained in the second combination signal (IDB+QDB)2 a time slot TS is selected in each of the non-acknowledged data carriers, in which time slot TS the relevant data carrier 2 supplies its next response signal RDB. The relevant time slot TS is again defined with the aid of the time slot defining means 65.

It is assumed (see item 5 in FIG. 4) that in the course of the second interrogation cycle IPER2 the two data carriers 2B and 2E together transmit their response signals RDB-2B and RDB-2E to the communication station 1 in the first time slot TS1". It is further assumed that the data carrier 2C transmits its response signal RDB-2C uniquely to the communication station in the second time slot TS2", and that the data carrier 2F transmits its response signal RDB-2F uniquely in the third time slot TS3", and that the two data carriers 2U and 2V transmit their response signals in the fifth time slot TS5", and that the data carriers 2W, 2X, 2Y transmit their response signals in the sixth time slot TS6", and that the data carrier 2Z transmits its response signal in the seventh time slot TS7". It is further assumed that all the data carriers transmit their response signals to the communication station 1 with a high signal strength and said signals are consequently received by the communication station 1 with a high signal level.

As a consequence of the assumptions described above, the data carriers 2C, 2F and 2Z are identified unambiguously with the aid of the response signal identification means 6B on the basis of their response signals, which are each supplied to the response signal identification means 6B of the process control means 6 by the decoding means 10 via the connection 15. Another consequence of this is that during the subsequent generation of the third acknowledge signal QDB3 the main bits MB associated with the second, the third and the seventh time slot are set to the value "1" during the subsequent third interrogation cycle IPER3.

In the course of the second interrogation cycle IPER2 the collision detection means 11 detect collisions in the first time slot and in the fifth time slot and in the sixth time slot, as a result of which during the subsequent generation of the third acknowledge signal QDB3 the main bits MB associated with the first, the fifth and the sixth time slot are set to the value "0" during the subsequent third interrogation cycle IPER3.

Since all the response signals RDB are received with a high signal level by the communication station 1 during the second interrogation cycle IPER2, all the additional bits AB in the third acknowledge signal QDB3 are set to the value "1" in the subsequent third interrogation cycle IPER3 during the subsequent generation of the third acknowledge signal QDB3.

After the evaluation of the response signals RDB received by the communication station 1 during the second interrogation cycle IPER2 the second interrogation cycle IPER2 has come to an end. Immediately after this, the third interrogation cycle IPER3 is started, in which the third combination signal (IDB+QDB)3 is transmitted from the communication station 1 to the data carriers 2 (see item 6 in FIG. 4). After the reception of the third combination signal (IDB+QDB)3 by each of the data carriers 2 the acknowledge signal QDB3 contained in the third combination signal (IDB+QDB)3 is evaluated with the aid of the acknowledge signal detection means 59. Since the main bits have been set to the value "1" for the data carriers 2C, 2F and 2Z, in which the time slots in which they have transmitted a response signal during the second interrogation cycle IPER2 are known, this evaluation causes acknowledgement of said data carriers, which means that these data carriers are disabled in view of the third interrogation cycle IPER3 just started and the subsequent interrogation cycles IPER4 etc. and consequently no longer partake in these interrogation cycles.

For the third interrogation cycle IPER3 it is assumed (see item 7 in FIG. 4) that the data carriers 2U, 2W, 2B and 2Y separately transmit their response signals to the communication station 1 in the first time slot TS1''', in the second time slot TS2''', in the third time slot TS3''' and in the eighth time slot TS8''', respectively. It is further assumed that the data carriers 2E, 2V and 2X have transmitted their response signals jointly in the fourth time slot TS4'''. It is further assumed that two data carriers 2K and 2L, which have newly entered into the communication range of the communication station 1, transmit their response signals jointly in the sixth time slot TS6'''. In the present case, it is further assumed that the data carriers 2U, 2W, 2B, 2E, 2V, 2X, 2K and 2L, which partake in the third interrogation cycle IPER3, transmit their response signals with a high field strength, as a result of which these response signals are received with a high signal level by the communication station 1, and that the data carrier 2Y, which partakes in the third interrogation cycle IPER3, supplies its response signal with a small signal strength and that this response signal is received with a low signal level by the communication station 1.

On account of the above assumptions the acknowledge signal QDB4, which is transmitted to the data carriers 2 in the fourth interrogation cycle IPER4, is subsequently generated in the course of the fourth interrogation cycle IPER4. As a result of the single reception of the response signals from the data carriers 2U, 2W, 2B and 2Y, the main bits MB in the fourth acknowledge signal QDB4 (see item 8.1 in FIG. 4), which are associated with the first, the second, the third and the eighth time slot, are each set to the value "1". Owing to the collisions in the fourth time slot TS4''' and in the sixth time slot TS6''', which collisions have occurred in the course of the third interrogation cycle IPER3, the main bits MB in the fourth acknowledge signal QDB4 which correspond to these time slots are set to the value "0". As a result of the low signal level of the response signal from the data carrier 2Y the additional bit AB associated with the eighth time slot in the fourth acknowledge signal QDB4 is set to the value "0" and as a result of the high levels with which all the other response signals are received the additional bits AB associated with the first, the second, the third, the fourth and the sixth time slot in the fourth acknowledge signal QDB4 are all set to the value "1".

After the termination of the third interrogation cycle IPER3 then fourth interrogation cycle IPER4 is started, in which the communication station 1 transmits the fourth combination signal (IDB+QDB)4 to all the data carriers 2U, 2W, 2B, 2E, 2V, 2X, 2K, 2L, 2Y, 2M, 2N and 2P present in the communication range, of which data carriers the data carriers 2U, 2W, 2B, 2E, 2V, 2X, 2K, 2L and 2Y were already present in the communication range of the communication station 1 during the third interrogation cycle IPER3, while the data carriers 2M, 2N and 2P have newly entered into this communication range. With the aid of the main bits MB associated with the first, the second, the third and the eighth time slot and having the value "1" acknowledgement is achieved for the data carriers 2U, 2W, 2B and 2Y, in which owing to the storage of their time slot numbers TSNO in their time slot number memory means 66 the time slots are known during which they supplied a response signal during the third interrogation cycle IPER3, i.e. they are set to an idle state. The other data carriers 2K, 2V, 2M, 2N, 2P, 2E, 2X, 2L partake in the fourth interrogation cycle IPER4.

It is assumed (see item 9 in FIG. 4) that of the aforementioned data carriers the data carriers 2K, 2V, 2P and 2L transmit their response signals separately in the first time slot TS1'''', in the third time slot TS3'''', in the fifth time slot TS5'''', and in the eighth time slot TS8'''', respectively. It is further assumed that the two data carriers 2M and 2N transmit their response signals jointly in the fourth time slot TS4''''. It is further assumed that the two data carriers 2E and 2X transmit their response signals jointly in the sixth time slot TS6''''. In the present case, it is further assumed that the data carrier 2X transmits its response signal with a low signal strength and that, as a consequence, the response signal is received with a low signal level by the communication station 1. The response signals of the other data carriers 2K, 2V, 2M, 2N, 2P, 2E and 2L have a high signal strength and are consequently received with a high signal level by the communication station 1.

As a consequence of the assumptions described above the communication station 1 generates a fifth acknowledge signal QDB5 during the subsequent fifth interrogation cycle IPER5, in which (see item 10.1 in FIG. 4) owing to the separate reception of the response signals from the data carriers 2K, 2V, 2P and 2L the main bits MB associated with the first, the third, the fifth and the eighth time slot are each set to the value "1". On account of the collision in the fourth time slot TS4'''' the main bit MB associated with the fourth time slot is set to the value "0" in the fifth acknowledge signal QDB5.

Although two data carriers, i.e. the two data carriers 2E and 2X, transmit their response signals to the communication station 1 in the sixth time slot TS6'''' during the fourth interrogation cycle IPER4, the communication station 1 detects only one response signal, namely the response signal from the data carrier 2E, which transmits its response signal with a high signal strength. The other data carrier 2X, however, transmits its response signal with such a small signal strength that the communication station 1 cannot receive this response signal. In practice, such a situation occurs when a data carrier, in the present case the data carrier 2X, is situated at such a large distance from the communication station 1 that the data carrier can still receive the combination signal (IDB+QDB), be it with a comparatively low level, which combination signal is always transmitted with a high level by the communication station 1, but that the response signal, which can only be generated with a comparatively low level by the data carrier, is too weak to be received by the communication station 1. In this case the data carrier 2X has transmitted a response signal, i.e. in the present case in the time slot TS6"" during the fourth interrogation cycle IPER4, but the communication station 1 has not received this response signal. However, during the sixth time slot TS6"" the communication station 1 also receives the response signal from the data carrier 2E because this has reached the communication station 1 with a high signal level. As a result of this, the signal strength detection means 12 detect a response signal with a high signal level in the sixth time slot"" and consequently generate high-level information HLI1 and supply this to the process control means 6 via the connection 17. A consequence of this is that the additional bit AB associated with the sixth time slot is also set to the value "1" in the fifth acknowledge signal QDB5. This is the same as in the case of the additional bits AB associated with the first time slot TS1 and the third time slot TS3 and the fourth time slot TS4 and the fifth time slot TS5 as well as the eighth time slot TS8, which additional bits AB are all set to the value "1".

After completion of the fourth interrogation cycle IPER4 the fifth interrogation cycle IPER5 is started, upon which (see item 10 in FIG. 4) immediately after the start the communication station 1 transmits the fifth combination signal (IDB+QDB)5 to all the data carriers 2K, 2V, 2M, 2N, 2P, 2E, 2X and 2L present in the communication range. As a consequence of this, the fifth acknowledge signal QDB5 is evaluated with the aid of the acknowledge signal detection means 59, as a result of which the data carriers 2K, 2V, 2P and 2L, in which owing to the storage of the relevant time slot numbers TSNO in the time slot number memory means 66 the time slots are known in which they have transmitted a response signal during the fourth interrogation cycle IPER4, are signed off by means of the respective main bits MB, which have been set to the value "1", and are consequently set to an idle state.

In the present situation the data carrier 2E, whose response signal has been received with a high signal level, also signs off on account of the main bit MB associated with the sixth time slot in the fifth acknowledge signal QDB5, which main bit MB has been set to the value "1" but the data carrier 2X, whose response signal was transmitted with a low signal strength by this data carrier and was no longer received by the communication station 1, does not sign off in spite of the fact that the main bit MB associated with the sixth time slot has the value "1". This is because during the transmission of the fourth combination signal (IDB+QDB)4 from the communication station 1 to the data carrier 2X the signal strength detection means 52 in the data carrier 2X have detected that the combination signal (IDB+QDB)4 transmitted to the data carrier 2X was received with only a weak signal level, in response to which said signal strength detection means 52 have generated low-level information LLI2 and supplied to the process control means 56 of the data carrier 2X via the line 54 and the connection 76. This means that in the data carrier 2X it is known that it is a data carrier which can receive a signal transmitted by the communication station 1 only with a low signal level. However, this also means that the communication station 1 can receive a signal generated by the data carrier 2X only with a very weak signal level or cannot be received at all. Thus, it is known in the process control means 56 of the data carrier 2X that the data carrier 2X is a data carrier which supplies only a very weak signal. However, with the aid of the acknowledge signal detection means 59 it is determined from the fifth acknowledge signal QDB5, namely from the main bit MB associated with the sixth time slot and having the value "1", that the communication station 1 has received a response signal with a high level in the sixth time slot TS6"" of the fourth interrogation cycle IPER4. However, this must be a response signal from another data carrier, in the present case the response signal from the data carrier 2E, because it cannot be the response signal of the data carrier 2X, which is a data carrier supplying a weak signal. Thus, with the aid of the acknowledge signal detection means 59 second detection information RES2 forming high-level information is applied to the process control means 56, which is indicative of a data carrier supplying a strong signal, while the process control means 56 also receive the low-level information LLI2 via the connection 76, which information is indicative of a data carrier supplying a weak signal. These two items of information, namely the second detection information RES2 forming high-level information in this case and the low-level information LLI2, contradict one another, which is detected with the aid of the process control means 56 and results in the data carrier 2X not being acknowledged and is consequently regarded as a non-acknowledged data carrier in the next interrogation cycle.

Thus, only three non-acknowledged data carriers 2M, 2N and 2X (see item 11 in FIG. 4) will partake in the fifth interrogation cycle IPER5. It is assumed that these three data carriers 2M, 2N and 2X each supply their response signals separately to the communication station 1 in the time slot TS2"", in the time slot TS4"" and in the time slot TS6"", respectively. It is now assumed that the two data carriers 2M and 2X supply their response signals with a low signal level and that the data carrier 2N supplies its response signal with a high signal level and that the three response signals from the three data carriers 2M, 2N and 2X are all received accordingly by the communication station 1. As a result of this (see item 12.1 in FIG. 4) the three main bits MB associated with the second, the fourth and the sixth time slot are each set to the value "1" in the sixth acknowledge signal QDB6 generated subsequently in sixth interrogation cycle IPER6 and the additional bits AB associated with the second time slot and the sixth time slot are each set to the value "0" and the additional bit AB associated with the fourth time slot is set to the value "1".

After completion of the fifth interrogation cycle IPER5 the sixth interrogation cycle IPER6 is started, in which (see item 12 in FIG. 4) the communication station 1 transmits the sixth combination signal (IDB+QDB)6 to the data carriers 2M, 2N and 2X immediately after the start. The result of this is that the acknowledge signal detection means 59 detect the main bits MB which are associated with the second, the fourth and the sixth time slot and which have the value "1" and, consequently, the three data carriers 2M, 2N and 2X, in which owing to the storage of the respective time slot numbers TSNO in the time slot number memory means 66 the time slots are known in which they have supplied a response signal during the fifth interrogation cycle IPER5, sign off. Thus, during the sixth interrogation cycle IPER6 (see item 13 in FIG. 4) no data carrier 2 will generate a response signal and, consequently, the communication station 1 will no longer receive a response signal. As a result of this, the communication station will generate a seventh acknowledge signal QDB7 in a subsequent interrogation cycle IPER7, in which signal I (see item 14,1 in FIG. 4) all the main bits MB and all the additional bits AB are set to the value "0", similarly as in the first acknowledge signal QDB 1.

After completion of the sixth interrogation cycle IPER6 the seventh interrogation cycle IPER7 is started. The communication station 1 then supplies a seventh combination signal (IDB+QDB)7 (see item 14 in FIG. 4). The seventh combination signal (IDB+QDB)7 includes the seventh acknowledge signal QDB7. On account of the fact that there are no longer any non-acknowledged data carriers 2 within the communication range of the communication station 1, assuming that no new data carriers have come within the communication range of the communication station 1, the entire interrogation process is terminated with the seventh interrogation cycle IPER7 (see item 15 in FIG. 4).

The method described hereinbefore has the great advantage that acknowledgement of a data carrier 2 identified during an interrogation cycle IPERn is not effected within the same interrogation cycle IPERn but that acknowledgement is not effected until the next interrogation cycle IPERn+1 and in a very efficient and simple manner because acknowledgement of all the data carriers 2 identified during an interrogation cycle IPERn is effected at the same time with the aid of only one acknowledge signal QDB, which in addition is preferably formed by a given number of additional bits AB.

In the method described hereinbefore, which is carried out with the aid of the communication station 1 as shown in FIG. 1 and data carriers 2 as shown in FIG. 2 only one additional bit AB is generated in addition to each main bit MB during the generation of an acknowledge signal QDB, which can be attributed to the fact that the signal strength detection means 12 in the communication station 1 and the signal strength detection means 52 in each data carrier 2 operate with only one threshold value, as a result of which the signal strength can be determined only in relation to this one threshold value. It is to be noted that such signal strength detection means can alternatively operate with the aid of a plurality of threshold values, in which case the signal strengths can be evaluated or determined in terms of amplitude in a plurality of signal strength steps, as a result of which it is no longer possible to use only one additional bit AB but at least two additional bits AB are associated with each main bit MB in the acknowledge signal QDB.

Furthermore, it is to be noted as regards the method described hereinbefore, as is apparent from FIG. 3, that with this method it is possible to select the times for the time slots TS and the times for the response signals RDB so that they are substantially equally long, as a result of which there is no time margin between successive response signals RDB, which is advantageous for a minimal overall duration of an interrogation process. However, it is to be noted that it may quite advantageous to select the times for the time slots TS slightly longer than the times for the response signals RDB, in which case the time difference between the length of time of a time slot TS and the length of time of a response signal RDB may be selected so large that a time margin of approximately 300 μs is obtained between two successive response signal RDB.

The invention claimed is:

1. A method of communication between a communication station and one or more data carriers, the data carriers present within a communication range of the communication station, the method comprising:

supplying an interrogation signal to all the data carriers present within the communication range allowing the communication station to start an interrogation cycle;

receiving the interrogation signal by all the data carriers present within the communication range during the interrogation cycle;

supplying a response signal from the one or more data carriers to the communication station in response to the interrogation signal;

receiving by the communication station one or more of the response signals individually and, as a consequence, separately;

receiving by the communication station one or more of the response signals at least two at a time and, as a consequence, not separately;

supplying an acknowledge signal from the communication station to any of the data carriers whose response signal has been received separately by the communication station;

receiving and evaluating the acknowledge signal by the data carrier whose response signal has been received separately by the communication station;

in which as a result of the evaluation of the acknowledge signal, disabling each data carrier whose response signal has been received separately by the communication station from receiving the interrogation signals supplied subsequently by the communication station:

in which after a termination of the interrogation cycle, supplying an interrogation signal by the communication station in order to start a subsequent interrogation cycle;

generating by the communication station each acknowledge signal as a component of an extended interrogation signal;

effecting the communication between the communication station and the data carriers in one or more time-sequential slots;

supplying the response signals in the time-sequential slots;

receiving by the communication station one or more of the response signals individually and therefore separately with each response signal appearing alone in a time slot, generating the acknowledge signal in the form of a digital signal with the aid of the communication station, where the digital signal represents a bit string having a given number of main bits, with each main bit associated with a time slot, and those main bits which are associated with a time slot in which a response signal from the data carrier has appeared alone are set to a given bit value;

adding to each main bit at least one additional bit, both the main bit and the one additional bit represented by means of the digital signal; and generating as a parameter of the data carrier the bit value of each additional bit.

2. A method as claimed in claim 1 further comprising generating the bit value of each additional bit as a representation of a signal strength of the response signal received by the communication station from the data carrier.

3. A communication station for the communication with one or more data carriers present within a communication range of the communication station, the communication station comprising:

interrogation signal generating means for generating an interrogation signal for starting an interrogation cycle;

transfer means for supplying the generated interrogation signal to all the data carriers present within the communication range, so that the interrogation signal can be received by all the data carriers present within the communication range;

station receiving means for receiving one or more response signals supplied by each of the data carriers in response to the received interrogation signal, in which one or more of the response signals can be received individually and, as a consequence, separately and one or more of the response signals can be received at least two at a time and, as a consequence, not separately;

acknowledge signal generating means for generating an acknowledge signal for each data carrier whose response signal has been received separately, whereby the acknowledge signal can be supplied to the relevant data carrier with the aid of the transfer means; and wherein the acknowledge signal generating means and the interrogation signal generating means are adapted to cooperate with each other so as to enable each acknowledge signal to be generated as a component of an extended interrogation signal;

the response signals communicated to the communication station in one or more time-sequential slots;

one or more of the response signals received individually and therefore separately with each appearing alone in a time slot; and the acknowledge signal generating means are adapted to generate the acknowledge signal in the form of a digital signal, the digital signal represents a bit string having a given number of one or more main bits where each main bit is associated with a time slot, and those main bits which are associated with a time slot in which the response signal from the data carrier has appeared alone have a given bit value;

the acknowledge signal generating means adapted to generate the acknowledge signal in the form of a digital signal, wherein an additional bit is added to each main bit of the digital signal and a bit value of each additional bit forms a representation of a parameter of a specific data carrier.

4. A communication station as claimed in claim 3 further comprising the acknowledge signal generating means adapted to generate the acknowledge signal in the form of a digital signal, wherein the bit value of each additional bit in the digital signal forms a representation of a signal strength of the response signal received by the communication station from the data carrier.

* * * * *